April 22, 1969 N. R. BROWNYER 3,439,400
METHOD OF MAKING TAPERED SPRING LEAF
Filed Aug. 22, 1966 Sheet 1 of 2
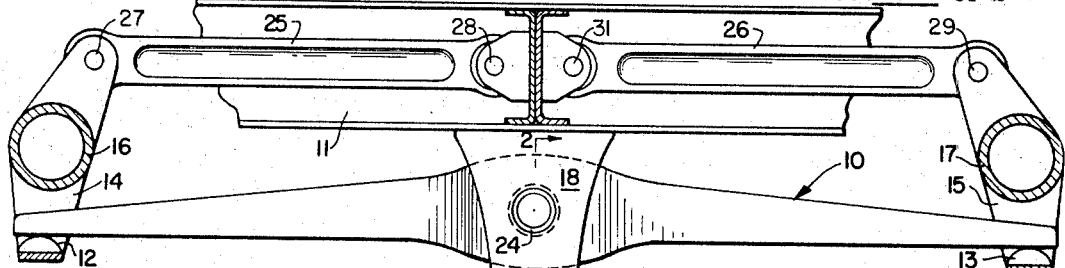
FIG. 1
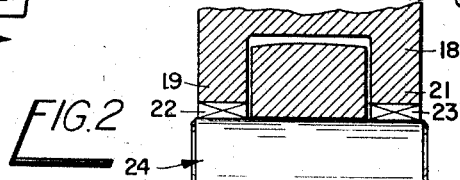
FIG. 2
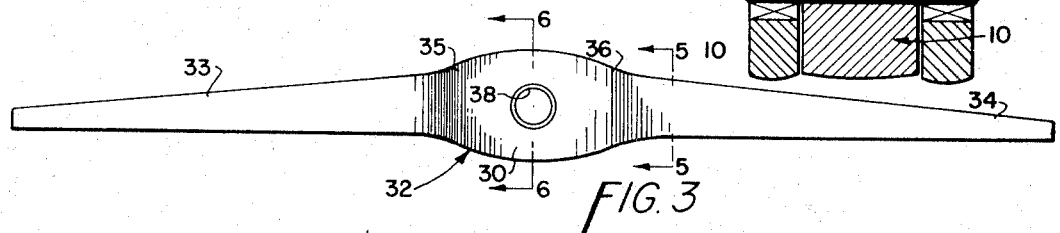
FIG. 3
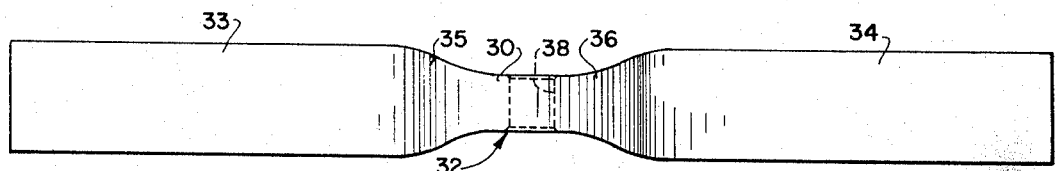
FIG. 4
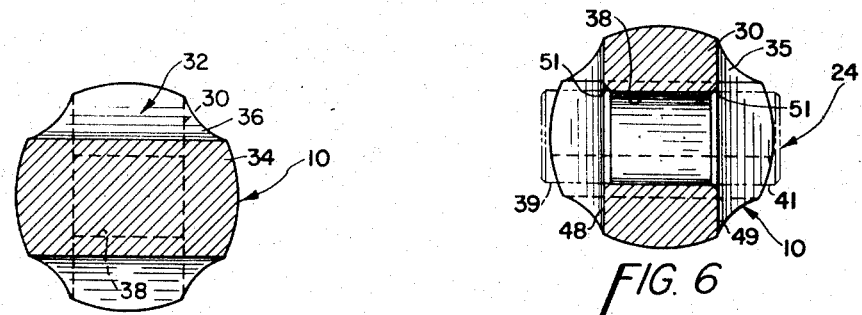
FIG. 5
FIG. 6
INVENTOR
Nelson R. Brownyer
BY
Strauch, Nolan, Neale, Nies & Bronaugh
ATTORNEYS

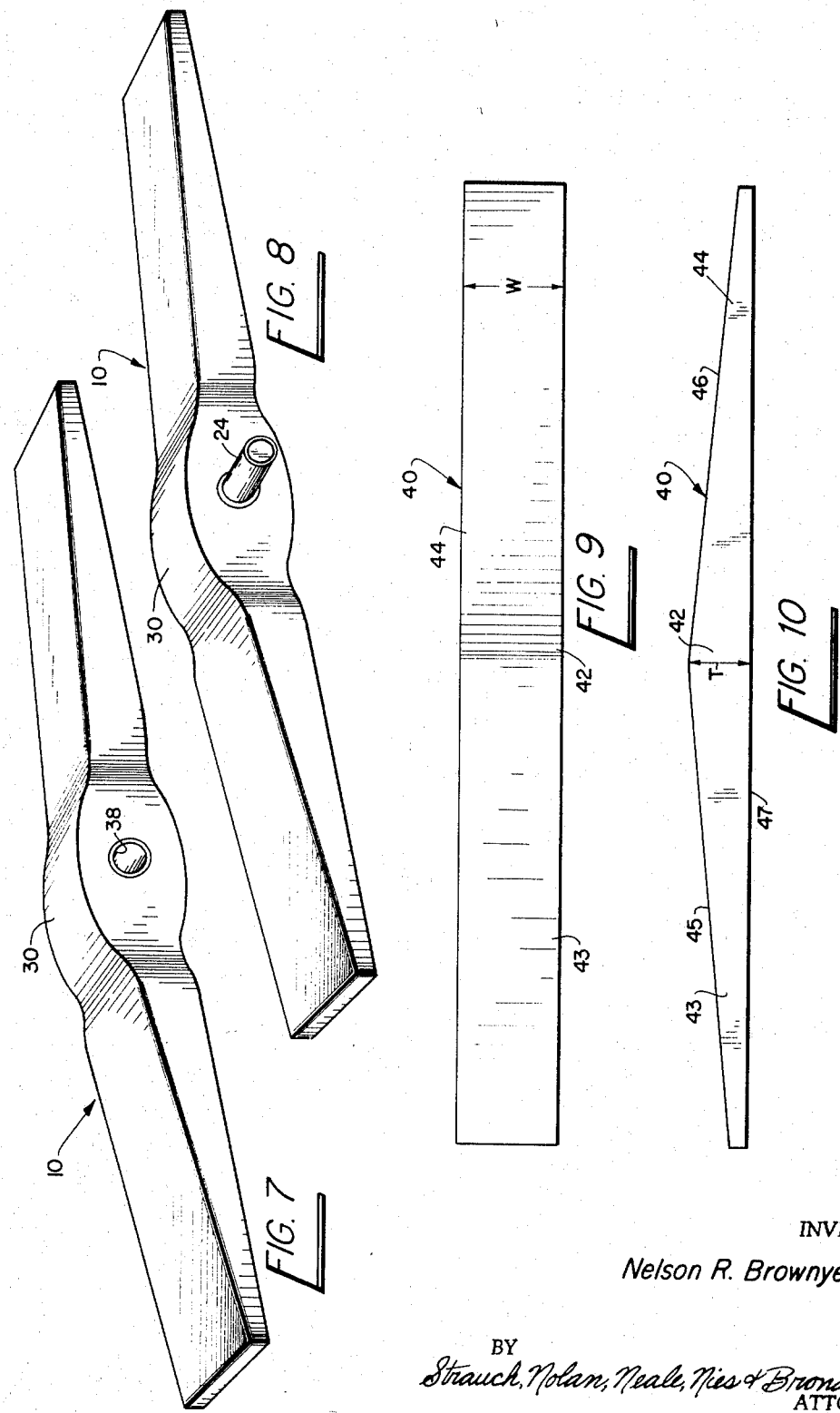

United States Patent Office 3,439,400
Patented Apr. 22, 1969

3,439,400
METHOD OF MAKING TAPERED SPRING LEAF
Nelson R. Brownyer, Birmingham, Mich., assignor to North American Rockwell Corporation, a corporation of Delaware
Filed Aug. 22, 1966, Ser. No. 574,193
Int. Cl. B21f *35/00;* B60g *11/02;* F16f *1/18*
U.S. Cl. 29—173                                    5 Claims

ABSTRACT OF THE DISCLOSURE

A method of making a vehicle spring beam comprising forming a steel beam of constant width from end to end and a relatively thick center portion from which the opposite ends taper toward the ends in decreasing cross section, and laterally compressing the beam center portion to reduce the width of the beam at that region while retaining the beam width in the remainder of the beam and to displace metal to materially increase the thickness of the center portion. Opposed trunnions are provided at the thickened center sections as by forming a bore transversely through the beam at the thickened center section and fixedly mounting a trunnion in the bore.

---

This invention relates to leaf spring suspensions for motor vehicles and more particularly to a heavy duty spring leaf having a special integral center structure strong enough to enable it to be transversely pivoted, as may be required for equalizer beam and suspension applications, and the method of making the same.

The spring leaf of the invention is decreasingly tapered from a maximum thickness center portion toward both ends and the center portion is reduced in width transversely of the longitudinal axis of the leaf to displace metal sufficiently to adequately increase the thickness at that center portion for mounting a trunnion pin adapted to be journalled in suitable bearings in a trunnion bracket on the vehicle. In the specific embodiment herein described the trunnion pin is mounted in an opening formed through the increased thickness center portion. In a related application Ser. No. 574,200, filed of even date herewith the trunnion pin comprises opposite ends welded onto opposite sides of the increased thickness center portion.

Beams for vehicle suspensions have been proposed, these usually comprising a rigid steel member centrally pivoted on the frame and mounted in resilient bearings or ball and socket joints at the axle connected ends. These beams were primarily provided to transfer driving and braking torque reactions to the frame and link the axles together in fixedly spaced relation longitudinally of the vehicle, but they added undesirably to the unsprung dead weight of the vehicle. To resiliently support the vehicle load and absorb road shocks, relatively large multileaf spring assemblies had to be used in conjunction with such rigid beams.

The present invention provides a novel resilient load supporting beam as the suspension wherein it performs many of the combined functions of the combination rigid beam and multileaf spring assemblies. The dead weight of the suspension is greatly reduced, increasing the load carrying capacity of the vehicle. Less space is needed for installation than for the more complex conventional constructions.

The resilient beam of the invention is in effect a heavy tapered spring leaf having a central portion of reduced width and materially increased thickness having oppositely extending trunnion pin ends, and it is a major object of the invention to provide a novel method of making such a beam.

It is another object of the invention to provide a novel method of making resilient integral beam wherein the beam is formed as a tapered spring leaf of constant width except for a restricted central waist portion where it is appreciably thicker than the remainder of the leaf and mounts a trunnion structure for pivotal mounting in a vehicle or the like.

A further object of the invention is to provide a novel method of making a resilient beam wherein a tapered spring leaf of constant width is formed, as by rolling or flame cutting from bar stock, and wherein the central portion thereof is laterally reduced by a mechanical operation that displaces metal to materially increase the thickness of said center portion.

Other novel features will appear as the following detailed description proceeds with reference to the accompanying drawings in which:

FIGURE 1 is a side elevation illustrating a spring beam of the invention installed in a representative suspension;

FIGURE 2 is a fragmentary view in section through line 2—2 of FIGURE 1;

FIGURE 3 is a side elevation showing a spring beam apart from the assembly;

FIGURE 4 is a top plan view of the beam of FIGURE 3;

FIGURE 5 is a section through the spring beam substantially along line 5—5 of FIGURE 3;

FIGURE 6 is a section through the spring beam substantially along line 6—6 of FIGURE 3;

FIGURE 7 is a generally perspective view of the spring beam of FIGURE 3;

FIGURE 8 is a perspective view similar to FIGURE 7 but showing a trunnion pin inserted through the center opening of the beam; and FIGURES 9 and 10 are respectively plan and side elevation views showing the beam in a preliminary form.

Spring beam 10 is shown in FIGURE 1 in a representative vehicle suspension installation. A beam 10 at each side of the vehicle is centrally pivoted on the frame 11 and the beam ends rest slidably on suitable wear pads 12 and 13 provided on brackets 14 and 15 rigid with tandem axle housings 16 and 17 respectively.

The frame support of beam 10 comprises a depending trunnion bracket 18 rigid with frame 11, and bracket 18 as shown in FIGURE 2 has parallel arms 19 and 21 mounting aligned bearings 22 and 23 respectively supporting opposite ends of a trunnion pin 24 rigid with beam 10.

The ends of spring beam 10 may be notched and supported in brackets 14 and 15 by the pivot block arrangements disclosed in Bixby et al. Patent No. 2,999,695.

Torque rods 25 and 26 extend between axles 16 and 17 respectively and the vehicle frame. Rod 25 has conventional pivot connections to axle 16 at 27 and to the frame at 28. Rod 26 has conventional pivot connections to the axle 17 at 29 and to the frame at 31. These torque rods function to maintain the tandem axle spacing longitudinally of the vehicle, and to transmit brake and drive torque reactions directly to the frame.

Beam 10 is made of a good grade of spring steel. As shown in FIGURE 4 the beam is of constant width from end to end except for a laterally restricted reduced width central waist portion 32. As shown in FIGURES 3 and 4, the beam 10 at the middle of waist portion 32 is a substantially uniform minimum width section 30 of materially greater thickness than the opposite end sections 33 and 34 which are tapered and gradually reduce in thickness toward the beam ends. The thickest beam section 30 is integral with the constant width end sections 33 and 34 and connected to them by transition sections 35 and 36 which, as shown in FIGURES 3 and 4, are of gradually changing width and thickness and merge smoothly at opposite ends into the adjoining beam sections.

The thickest beam section 30 is formed with a central transverse cylindrical bore 38 which has its axis perpendicular to the length of the beam 10, and this bore has press fitted therein the cylindrical trunnion pin 24 (FIGURE 6) having oppositely projecting ends 39 and 41 that fit into bearings 22 and 23 in the suspension assembly of FIGURE 1.

Beam 10 is preferably made by first taper rolling and treating a length of steel stock according to the method disclosed in Greene et al. Patent No. 3,238,072, using for example the taper rolling machine of Krause Patent No. 3,145,591 for the taper rolling operation. This produces a spring beam 40 of constant width W having a thicker center section 42 of thickness T from which taper the opposite end sections 43 and 44 as shown in FIGURES 9 and 10. The surfaces 45 and 46 are the taper rolled surfaces, and the surface 47 is straight from one end of the spring leaf blank to the other.

Optionally the constant width tapered spring beam of FIGURES 9 and 10 may be formed by flame cutting from bar stock as disclosed and claimed in the copending application of Willard F. Perdue et al. Ser. No. 587,607, filed Sept. 12, 1966 where heavy duty spring beams not conveniently taper rolled are required.

After the spring beam 40 has been formed as shown in FIGURES 9 and 10, the central portion 42 of the beam is hot forged in a hydraulic press in a direction transverse to the longitudinal axis of the beam with pressure exerted in a horizontal plane from both sides of the beam towards the central axis thereof to provide the restricted waist section 32 of FIGURE 4 which is of materially but gradually decreased width and increased thickness relative to the remainder of the beam. By this operation metal is displaced vertically to form the thickest center section 30 and the transition sections 35 and 36. The opposite side faces 48 and 49 of the thicker section 30 (FIGURE 6) are flat and parallel to the longitudinal axis of the spring beam.

Bore 38 is then formed through thick section 30 with its axis at right angles to faces 48 and 49. Bore 38 may be chamfered at 51 at both ends to facilitate the insertion of the trunnion pin 24, which is suitably nonrotatably press fitted therein. The ends 39 and 41 of the trunnion pin 24 project on both sides out of bore 38 for insertion into the bearings on vehicle bracket 18 where they are rotatably retained so that upon assembly spring beam 10 pivots within bracket 18.

Bore 38 is preferably formed after heat treatment of spring beam 10 to insure that there will be no change in the accurate dimension of the formed bore and thus insure proper fit with the trunnion pin.

The steps of grinding the beam surfaces, shot peening the ground surfaces at the tension side of the spring beam, and bulldozing disclosed in said Letters Patent No. 3,238,072 may be performed before or after the formation of waist section 32.

The restricted waist section 32 may allow a slight diagonal flexing of beam 10 when the suspension is diagonally articulated, which may be advantageous to reduce bearing loads. Bore 38 with or without the inserted pin 24 greatly facilitates handling of the relatively heavy spring beam 10 for in-shop transporting and during shipment.

The redistribution of metal effected by the formation of waist section 30 provides an integral metal cross section of sufficient strength around the bore 38 for adequate trunnion pin support, and the lateral restriction of the waist section 32 enables bracket 18 to be narrower and provide adequate support for the beam while reducing the bracket size and weight. As shown in FIGURE 6, the trunnion pin ends lie substantially within the lateral bounds of the width of the beam, so that a compact arrangement results.

The present invention may be embodied in other forms without departing from the spirit and essential characteristic thereof, therefore, the present embodiments are considered in all respects as illustrative only and not restrictive, the scope of the invention being indicated by the appended claims rather than by the foregoing description.

What is claimed and desired to be secured by Letters Patent is:

1. The method of making a spring beam which comprises the steps of forming a steel beam that is of substantially constant width from end to end and has a relatively thick center portion from which the opposite ends taper toward the ends in decreasing cross section, and laterally compressing said center portion of the beam to reduce the width of the beam at that region while retaining the beam width in the remainder of the beam and to displace metal to materially increase the thickness of said center portion.

2. The method defined in claim 1, further comprising the step of mounting a trunnion on said beam at said thickened center portion.

3. The method defined in claim 1, further comprising the step of forming a transverse trunnion pin mounting bore through the beam across the reduced beam width at said increased thickness center portion.

4. The method defined in claim 3 wherein a trunnion pin is press fitted tightly into said bore.

5. The method of making a spring beam which comprises the steps of forming a steel beam that is of substantially constant width from end to end and has a relatively thick center portion from which the opposite ends taper in decreasing cross section, and mechanically working said center portion of the beam to reduce the beam width at that region and form flat parallel side faces on opposite sides of the center portion of said beam that are spaced apart less than the width of said beam while substantially retaining the beam width in the remainder of the beam.

References Cited

UNITED STATES PATENTS

| | | | |
|---|---|---|---|
| 1,959,027 | 5/1934 | Hemstreet | 29—173 X |
| 2,779,998 | 2/1957 | Bailey | 29—470.3 |
| 3,204,944 | 9/1965 | Brownyer | 267—47 |
| 3,238,072 | 3/1966 | Greene et al. | 29—173 X |

THOMAS H. EAGER, *Primary Examiner.*

U.S. Cl. X.R.

267—47; 29—525, 558